(12) United States Patent
Thrane

(10) Patent No.: US 11,148,838 B2
(45) Date of Patent: Oct. 19, 2021

(54) PRODUCT DISPENSER AND A METHOD OF DISPENSING A FLOWABLE PRODUCT

(71) Applicant: CABINPLANT INTERNATIONAL A/S, Harby (DK)

(72) Inventor: Niels Ulrik Lund Thrane, Harndrup (DK)

(73) Assignee: CABINPLANT INTERNATIONAL A/S, Harby (DK)

( * ) Notice: Subject to any disclaimer, the term of this patent is extended or adjusted under 35 U.S.C. 154(b) by 148 days.

(21) Appl. No.: 15/580,232

(22) PCT Filed: Jun. 3, 2016

(86) PCT No.: PCT/EP2016/062652
§ 371 (c)(1),
(2) Date: Dec. 6, 2017

(87) PCT Pub. No.: WO2016/193428
PCT Pub. Date: Dec. 8, 2016

(65) Prior Publication Data
US 2018/0155069 A1    Jun. 7, 2018

(30) Foreign Application Priority Data

Jun. 4, 2015 (EP) .................................. 15170698

(51) Int. Cl.
*B65B 3/08* (2006.01)
*B65B 39/00* (2006.01)
(Continued)

(52) U.S. Cl.
CPC .................. *B65B 3/08* (2013.01); *B65B 3/30* (2013.01); *B65B 37/06* (2013.01); *B65B 39/005* (2013.01);
(Continued)

(58) Field of Classification Search
CPC .. B65B 3/08; B65B 3/30; B65B 3/305; B65B 37/08; B65B 37/10; B65B 39/005; B65B 39/14; B65B 1/12; B65B 3/04
(Continued)

(56) References Cited

U.S. PATENT DOCUMENTS 2,150,479 A * 3/1939 Anderson ................. B65B 3/30
222/318
2,827,207 A * 3/1958 Sprole ..................... G01F 11/02
222/217
(Continued)

FOREIGN PATENT DOCUMENTS

EP    2278284    1/2011
EP    2484593    8/2012
(Continued)

OTHER PUBLICATIONS

International Search Report on corresponding PCT application (PCT/EP2016/062652) from International Searching Authority (EPO) dated Sep. 16, 2016.
(Continued)

*Primary Examiner* — Andrew D StClair
(74) *Attorney, Agent, or Firm* — Klein, O'Neill & Singh, LLP

(57) ABSTRACT

The present invention relates to a method and a product dispenser comprising a tank for storing a flowable product and a conveyor for conveying storage containers along a longitudinal direction from an entry position to an exit position. The product dispenser further comprises a dosing mechanism extending in the longitudinal direction above the conveyor. The dosing mechanism comprises an inner cylindrical part and an outer cylindrical part enclosing and sealing against the inner cylindrical part. The inner cylindrical part defines a circumferential groove and a helically shaped groove extending between the entry position and the
(Continued)

exit position. The outer cylindrical part defines an elongated opening extending in the longitudinal direction and an inlet opening for establishing a fluid path from the tank via the circumferential groove and the helically shaped groove to the elongated opening. The inner cylindrical part is rotatable for dispensing the flowable product into the storage containers.

11 Claims, 18 Drawing Sheets

(51) Int. Cl.
| | |
|---|---|
| *B65B 39/14* | (2006.01) |
| *B65B 43/52* | (2006.01) |
| *B65B 43/56* | (2006.01) |
| *B65B 3/30* | (2006.01) |
| *B65B 37/06* | (2006.01) |
| *B65B 1/12* | (2006.01) |
| *B65B 1/36* | (2006.01) |

(52) U.S. Cl.
CPC .............. *B65B 39/14* (2013.01); *B65B 43/52* (2013.01); *B65B 43/56* (2013.01); *B65B 1/12* (2013.01); *B65B 1/36* (2013.01)

(58) Field of Classification Search
USPC ................................................ 222/412, 413
See application file for complete search history.

(56) References Cited

U.S. PATENT DOCUMENTS

| | | | | |
|---|---|---|---|---|
| 2,827,928 | A * | 3/1958 | Guckel | B65B 3/26 |
| | | | | 141/134 |
| 3,717,752 | A * | 2/1973 | Warning | A21C 15/002 |
| | | | | 239/654 |
| 4,877,568 | A * | 10/1989 | Austin | B29C 48/94 |
| | | | | 264/211.21 |
| 5,400,836 | A * | 3/1995 | Divall | B65B 3/30 |
| | | | | 141/1 |
| 5,529,099 | A * | 6/1996 | Janek | B65B 3/32 |
| | | | | 141/129 |
| 6,223,949 | B1 * | 5/2001 | Spencer | A23G 3/2015 |
| | | | | 137/605 |
| 2013/0126309 | A1 * | 5/2013 | Osmani | B65G 33/265 |
| | | | | 198/676 |

FOREIGN PATENT DOCUMENTS

| | | |
|---|---|---|
| EP | 2737802 | 6/2014 |
| FR | 2866705 | 8/2005 |
| GB | 1414967 | 11/1975 |

OTHER PUBLICATIONS

Written Opinion on corresponding PCT application (PCT/ EP2016/ 062652) from International Searching Authority (EPO) dated Sep. 16, 2016.

* cited by examiner

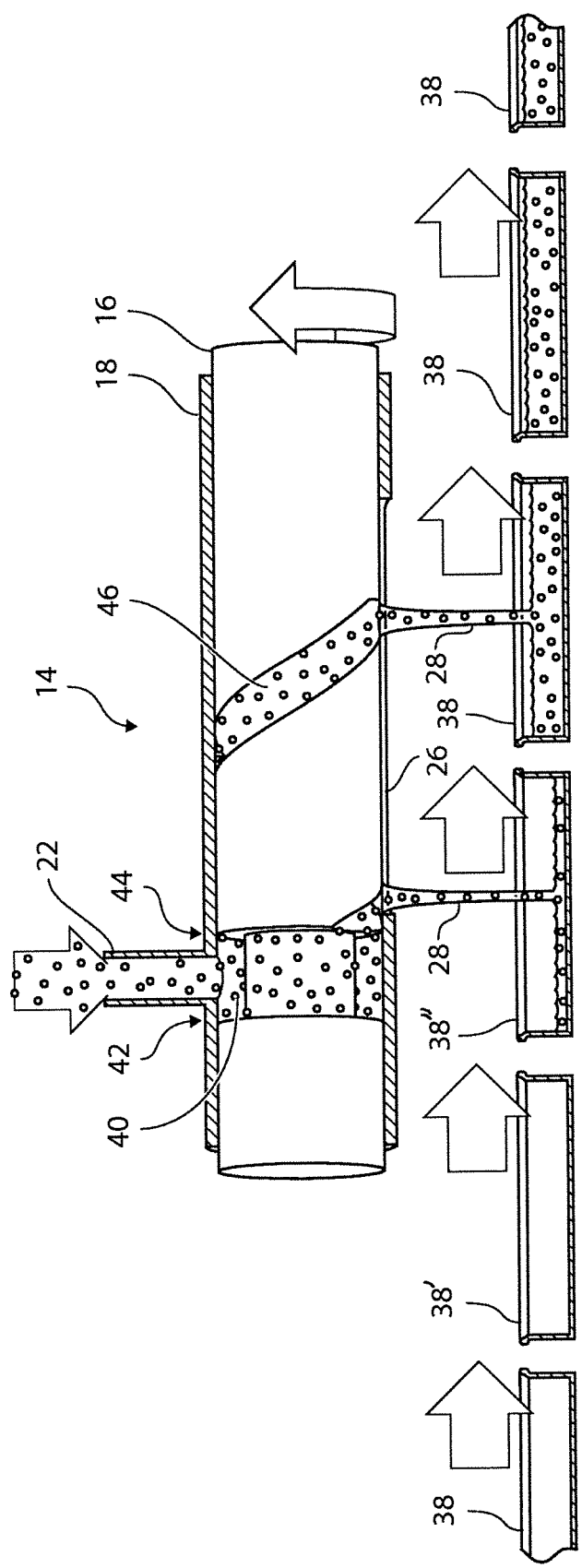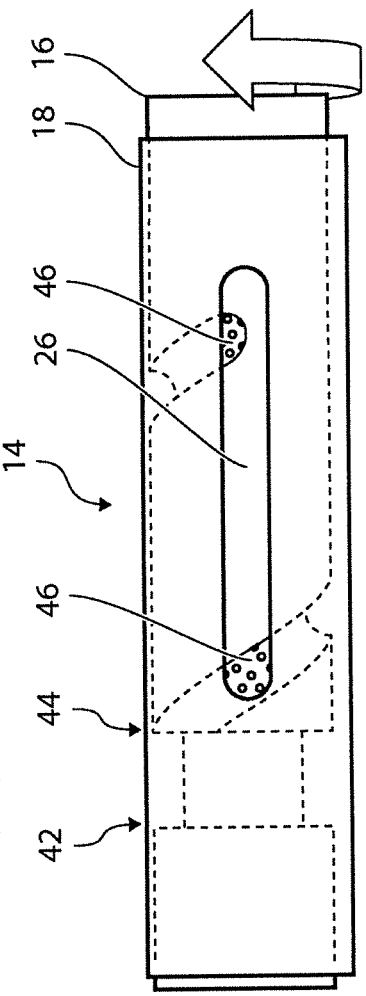
FIG. 3A
FIG. 3B

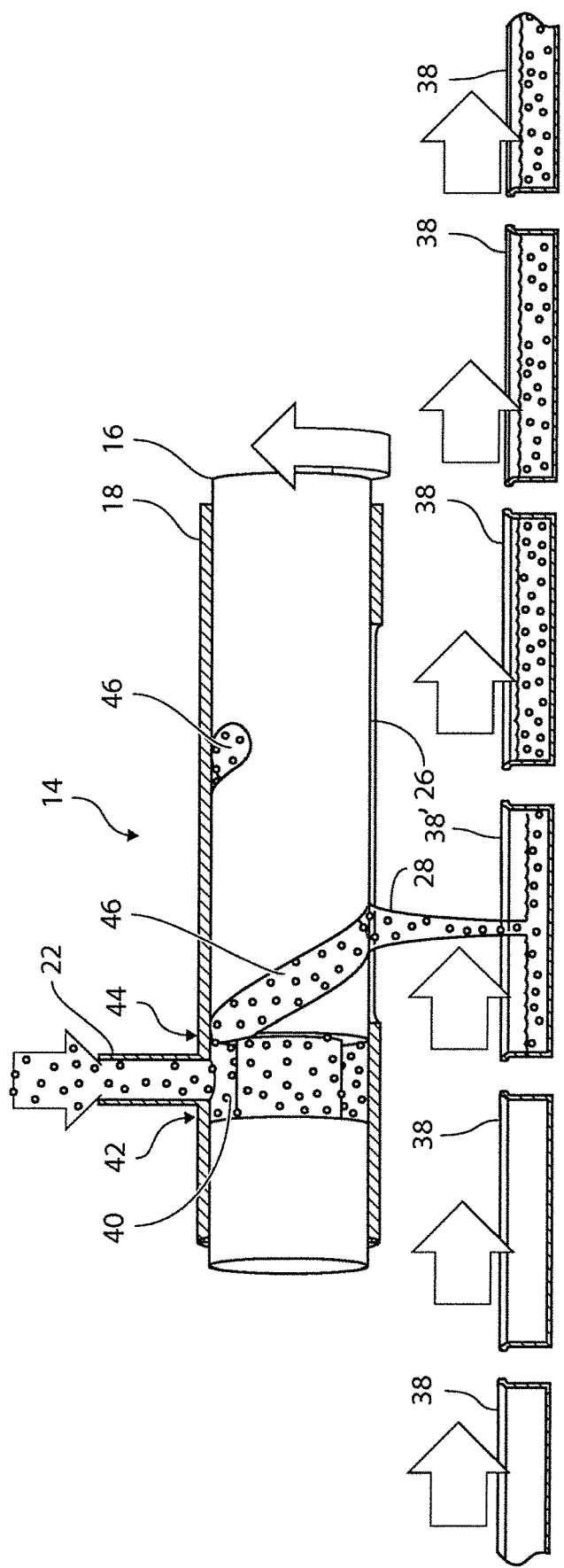
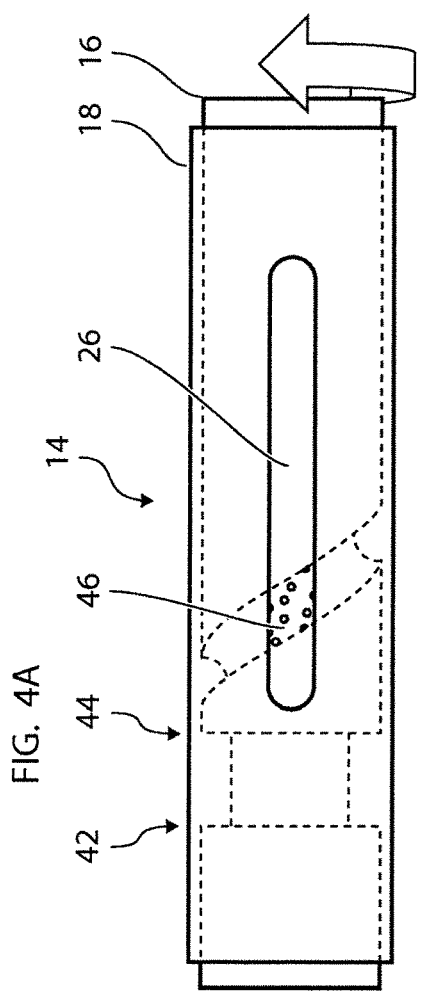
FIG. 4A
FIG. 4B

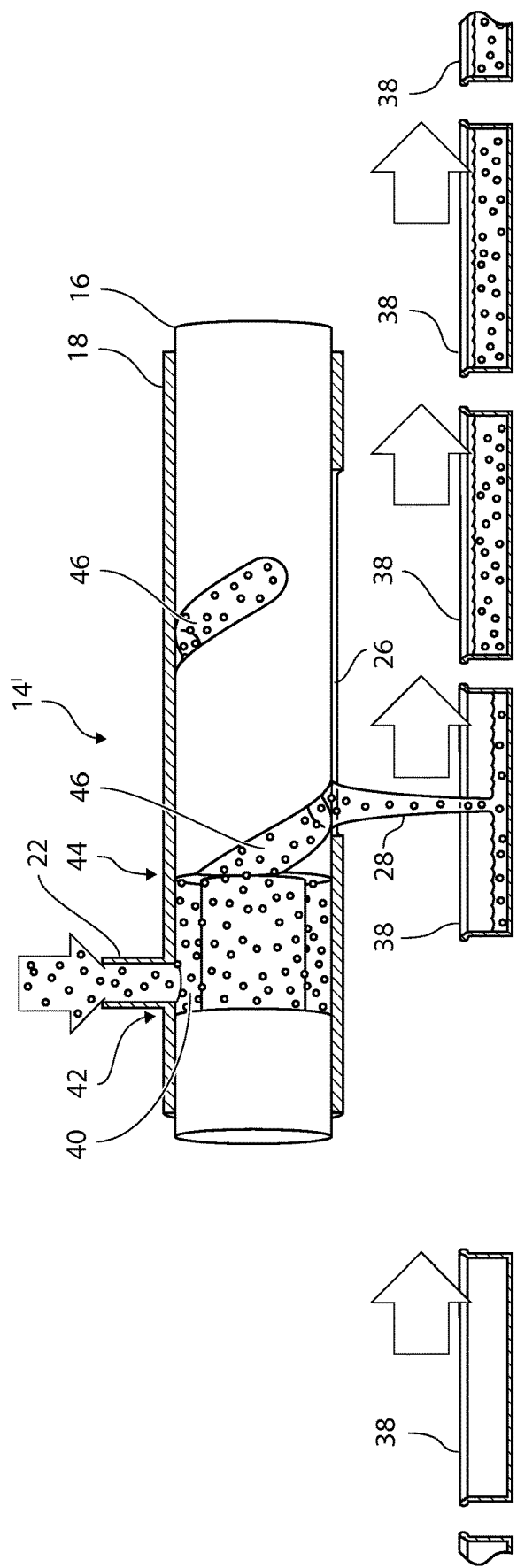
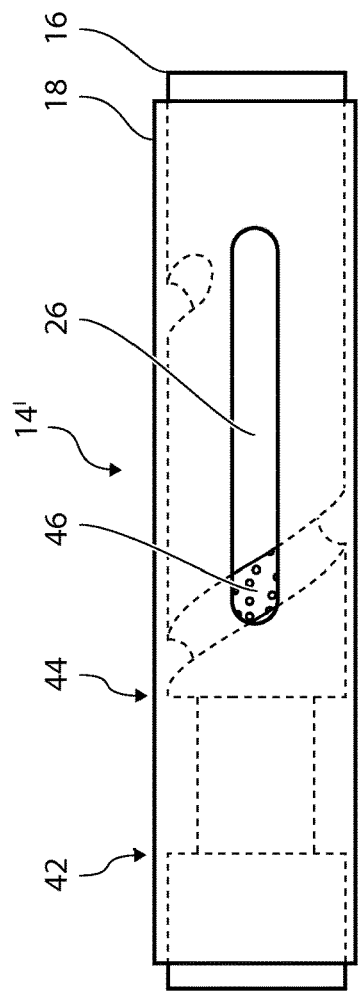
FIG. 5A
FIG. 5B

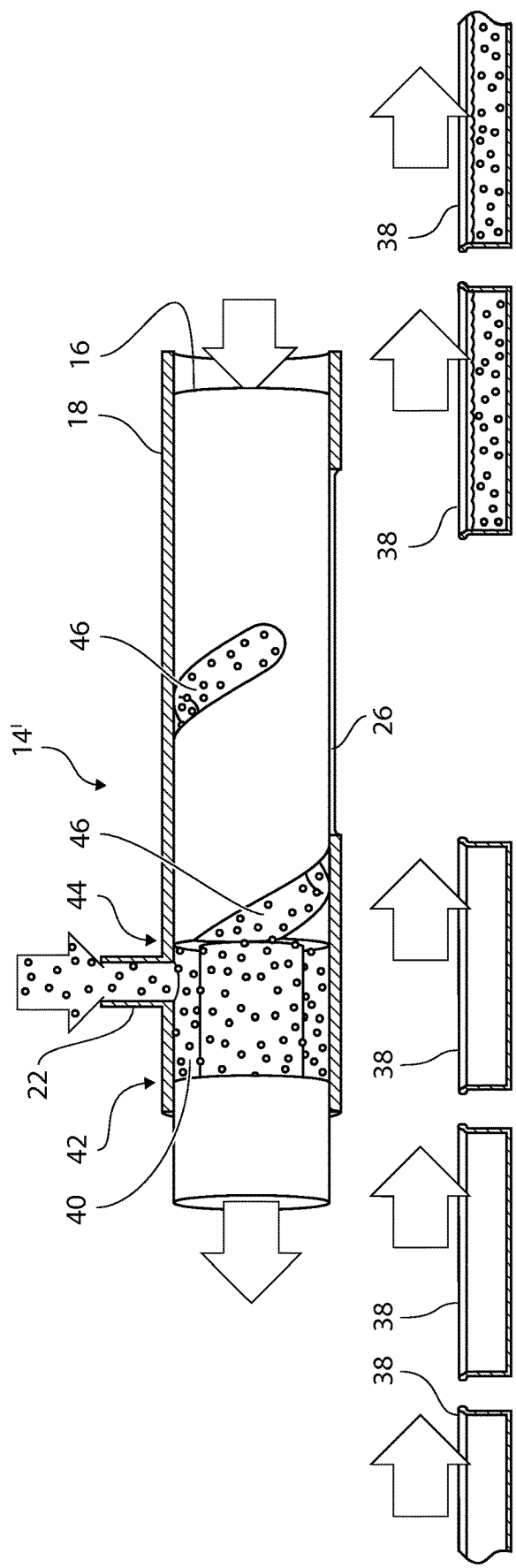
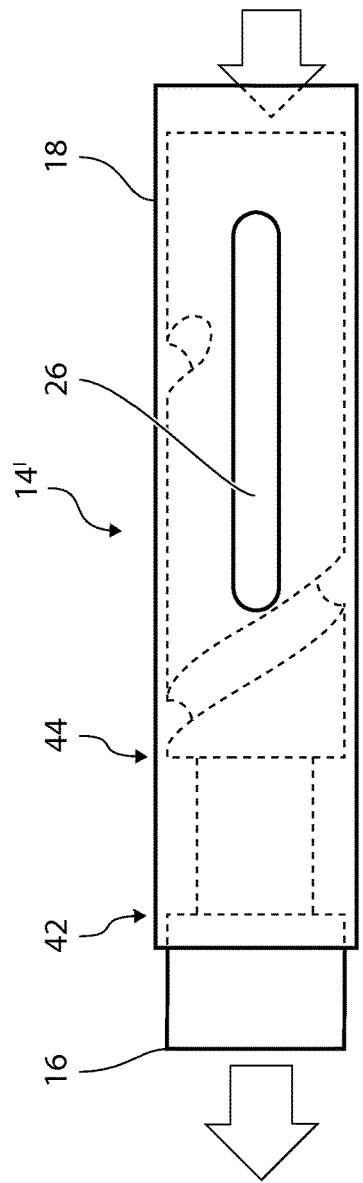
FIG. 6A
FIG. 6B

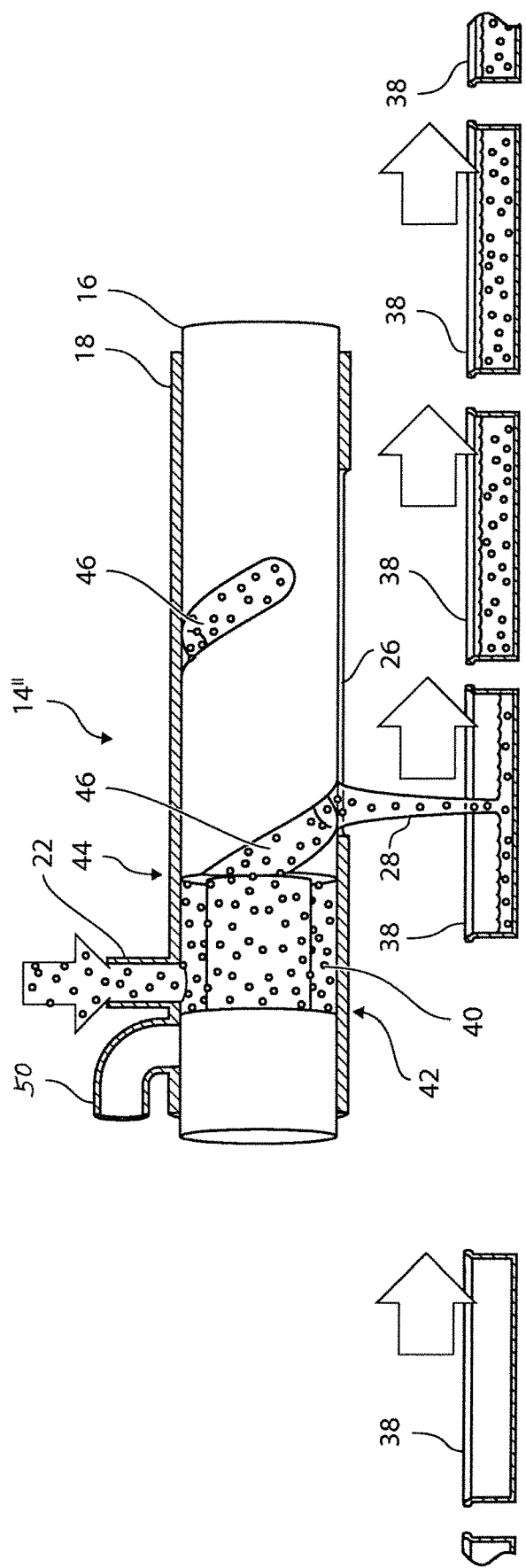
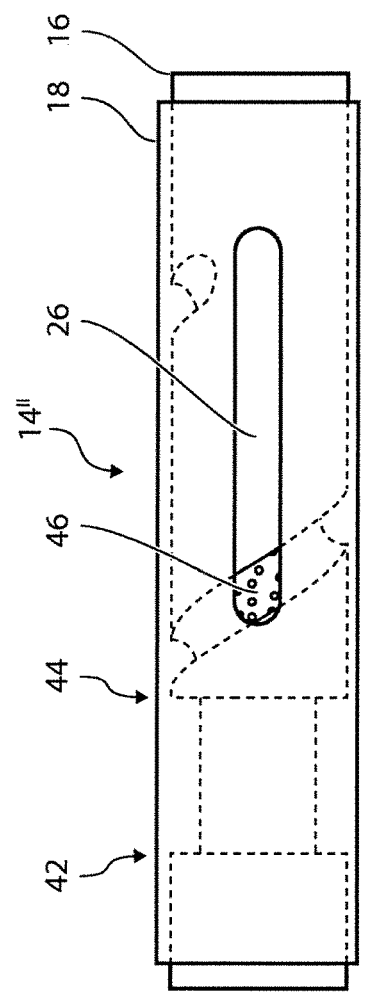
FIG. 7A
FIG. 7B

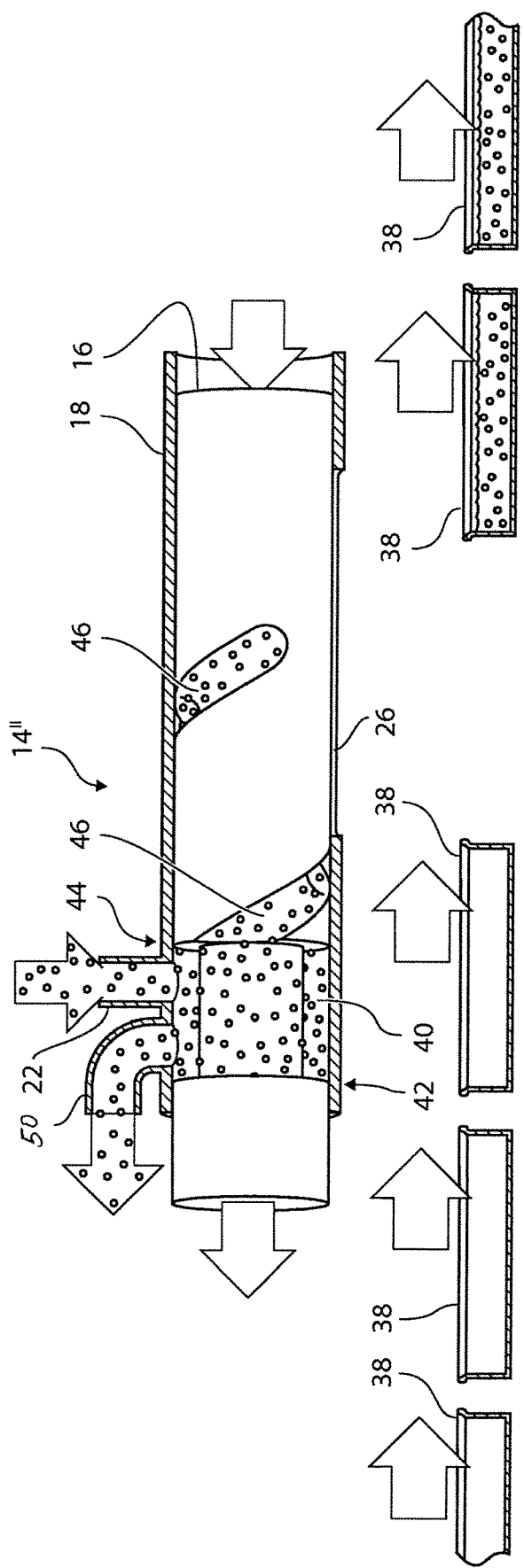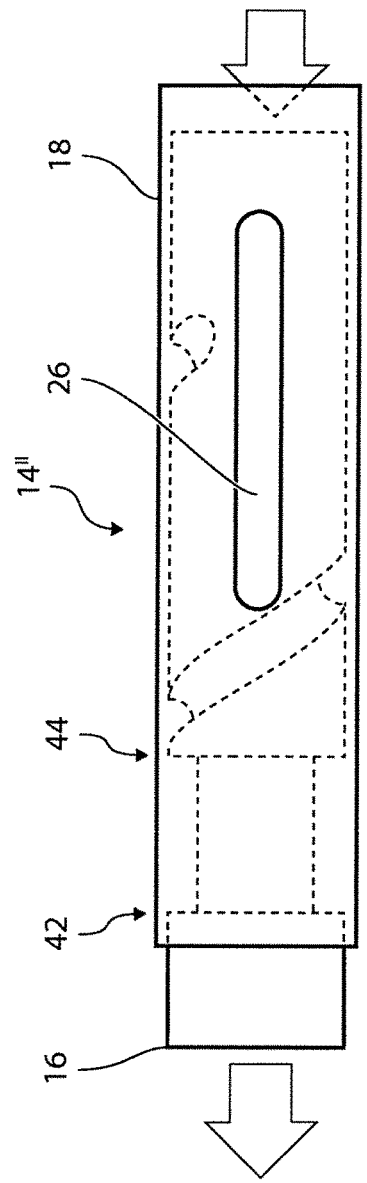
FIG. 8A
FIG. 8B

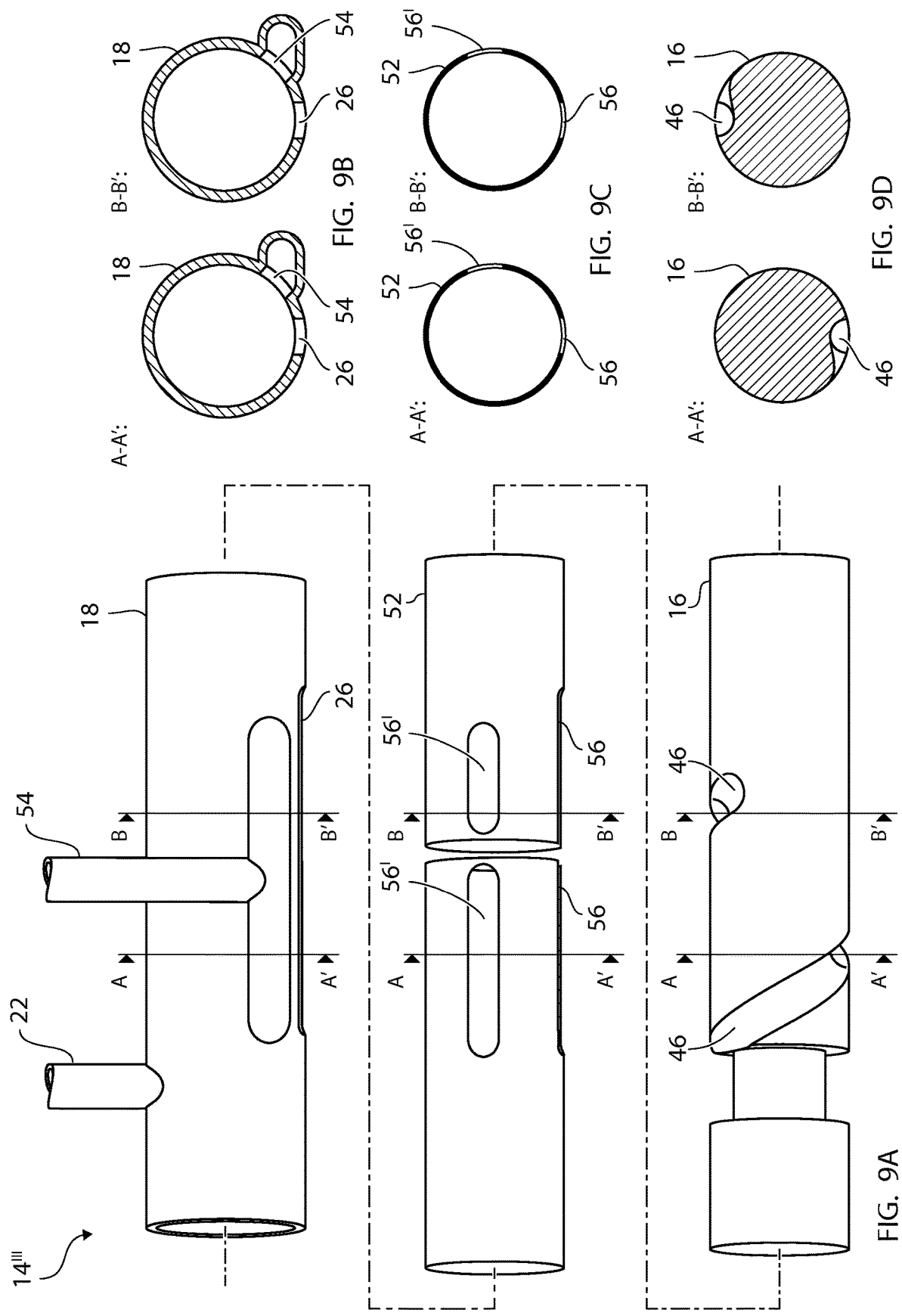

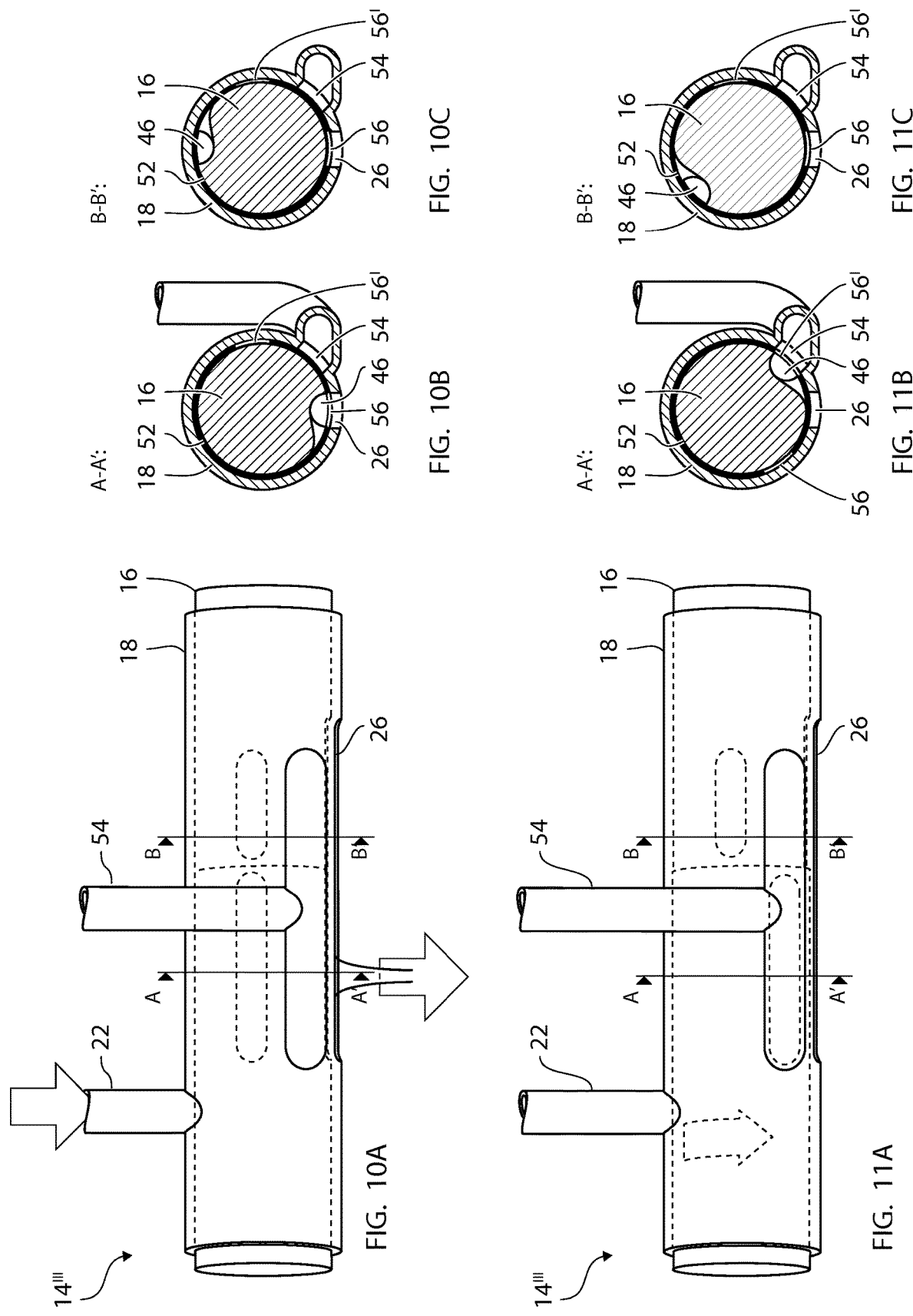

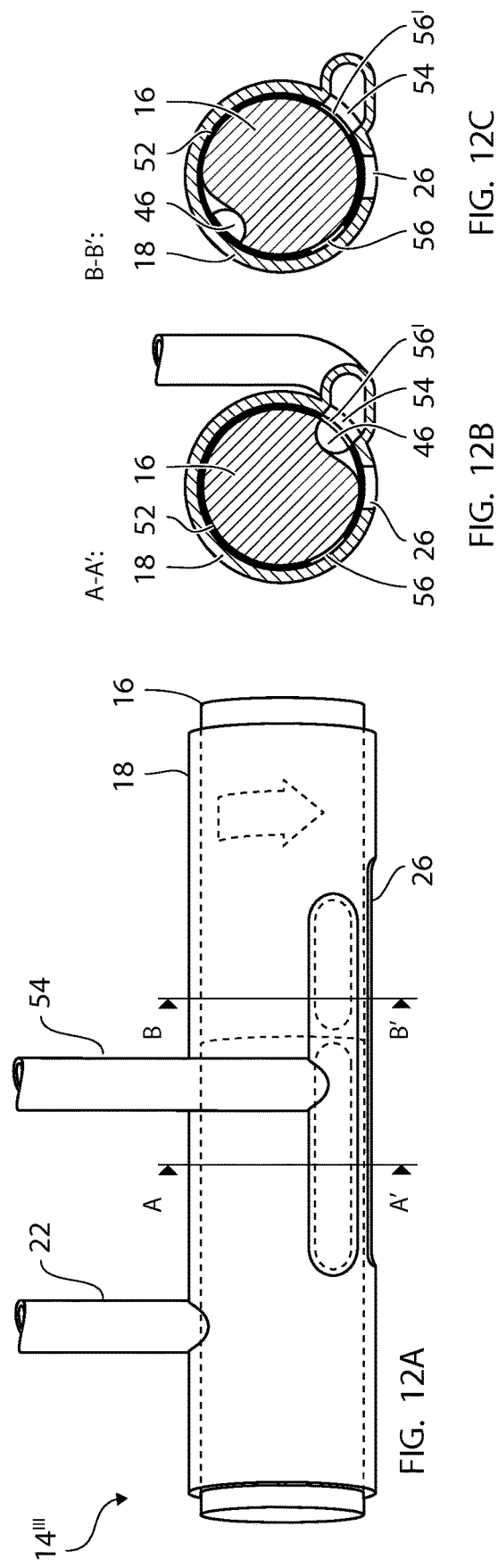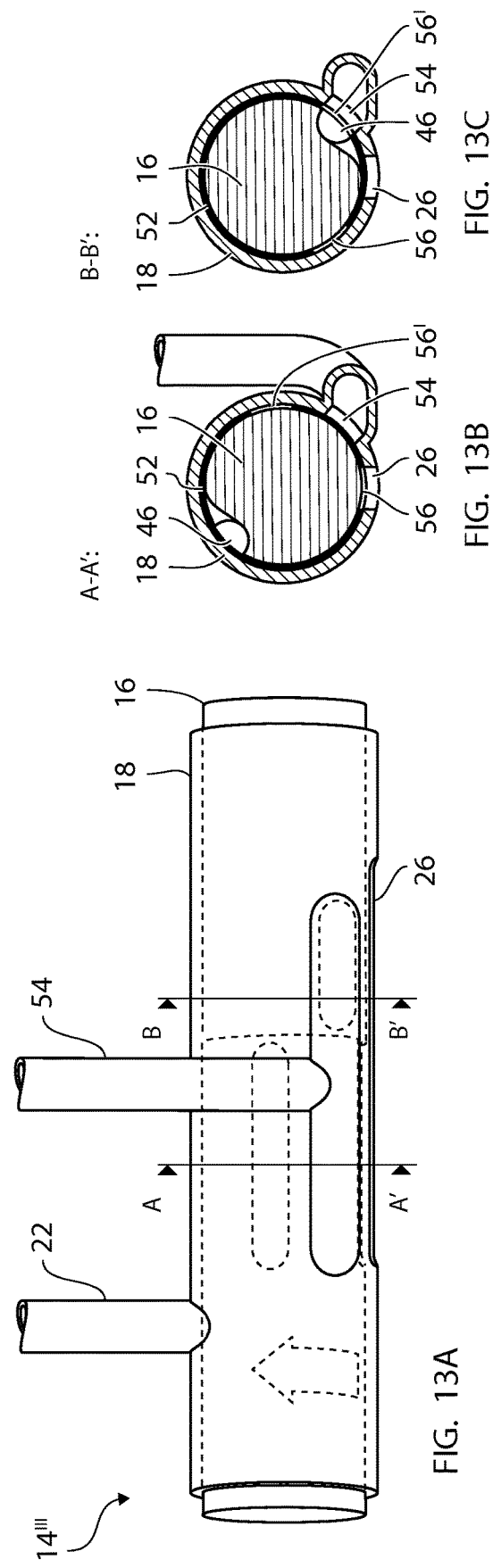

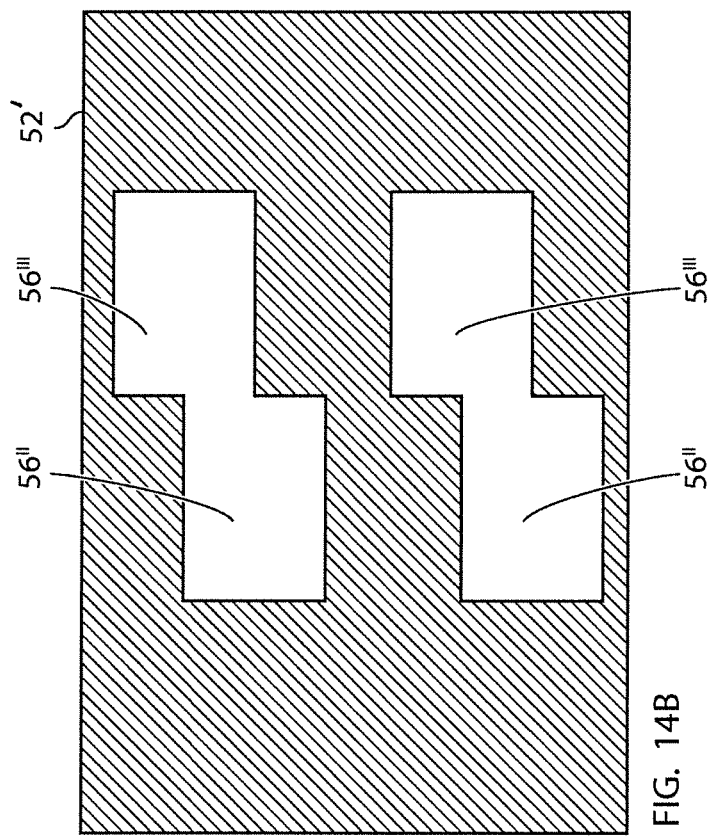
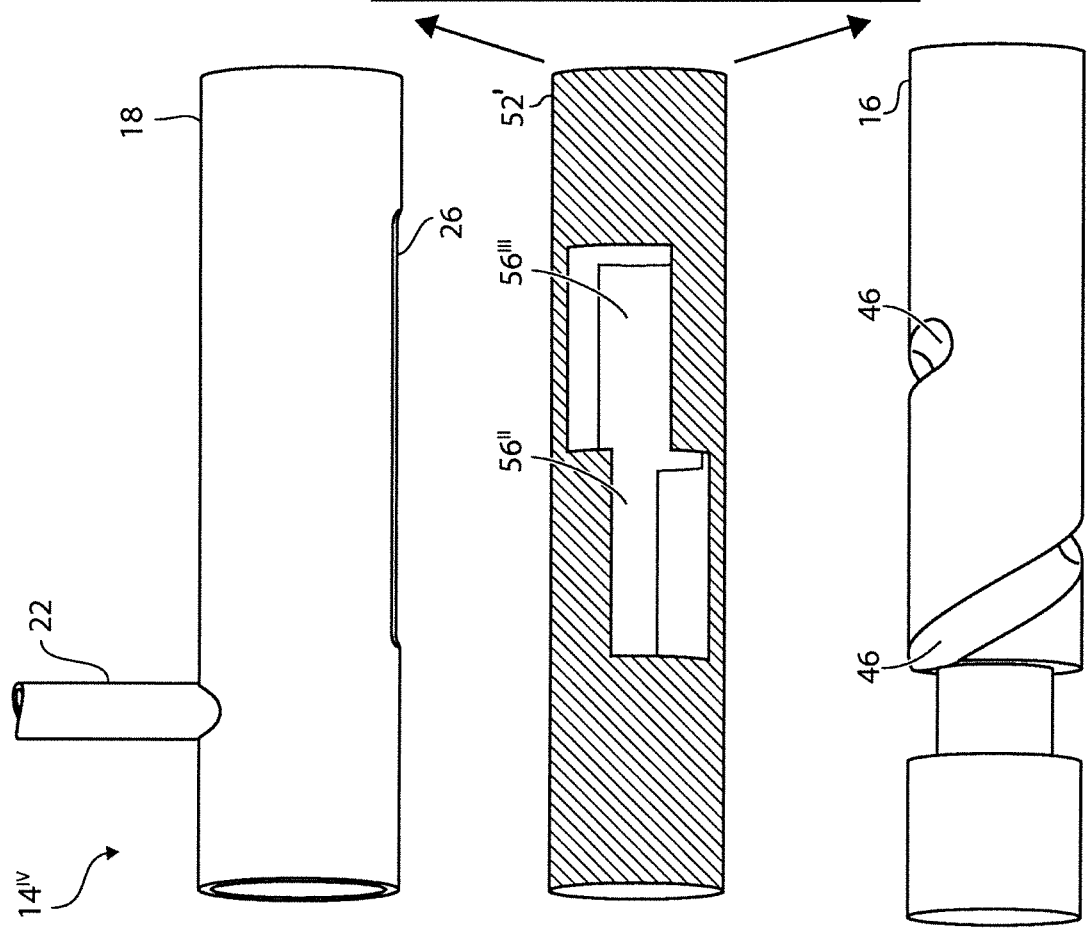
FIG. 14B
FIG. 14A

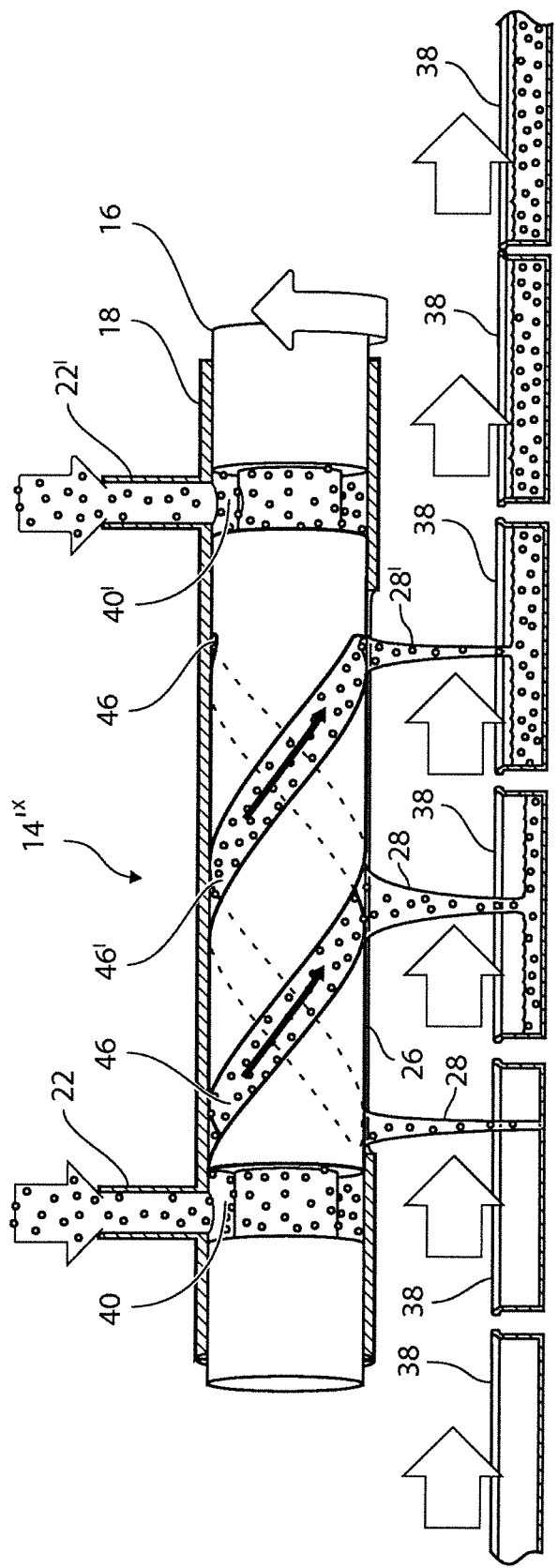
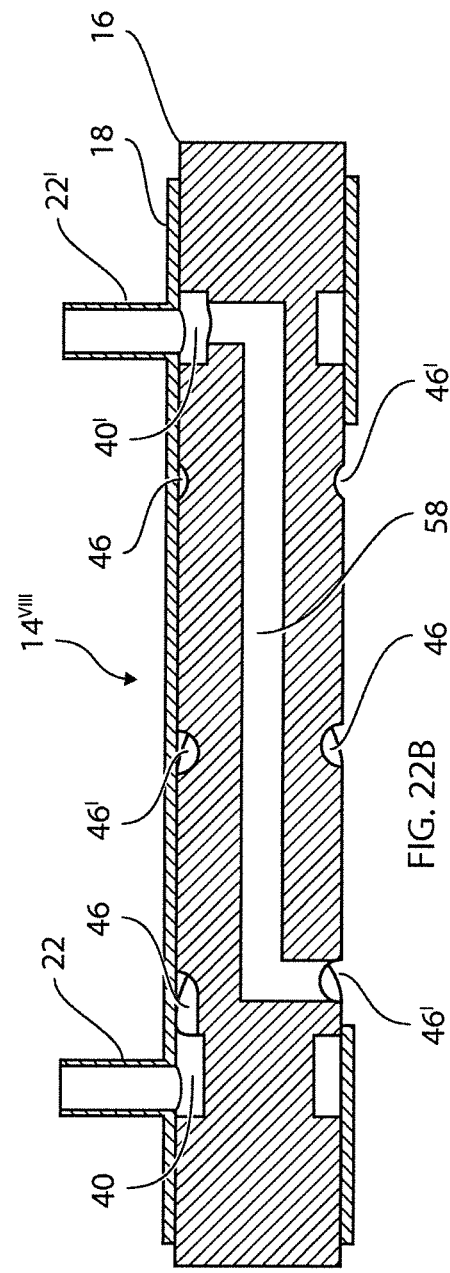
FIG. 22A
FIG. 22B

PRODUCT DISPENSER AND A METHOD OF DISPENSING A FLOWABLE PRODUCT

CROSS REFERENCE TO RELATED APPLICATION

This application is the US national phase of International Application No. PCT/EP2016/062652, filed Jun. 3, 2016, which claims priority from EP 15170698.3, filed Jun. 4, 2015. The disclosures of both of the referenced applications are incorporated herein by reference in their entireties.

BACKGROUND

The present invention relates to a product dispenser and a method of dispensing a flowable product.

INTRODUCTION

Weighing and packaging of food products places high demand on both hygiene and efficiency. Typically, empty product containers, such as glass jars or metal cans, are provided on a continuously running conveyor belt. The product containers are then filled at a filling station without stopping the conveyor belt. Typical solid food products include fish, poultry, meat etc. In order to ensure that every product container is filled by substantially the same amount of product, a combination weigher may be used. Examples of such combination weighers are described in EP 2278284 and EP 2484593.

In many cases the solid food products are packaged together with a liquid food product, such as a marinade, broth, brine, liquor, syrup, sauce or the like. A food processing system for marinated food products has been disclosed in EP 2737802. This prior art food processing system utilizes a set of intermediate containers in which the solid food product and the marinade are mixed before being dispensed into a product container. However, in some cases no mixing is required and the liquid food product may be added after the solid food product has been introduced into the product container. It is thus an object according to the present invention to provide technologies for continuously dispensing a flowable product into product containers.

In the present context the term flowable product is used for liquids as well as semi liquids and pastes. Semi liquids include various granulated solid food products such as powders and flakes which exhibit a flowable behaviour. Pastes may include liquids, solids or mixtures thereof having a high viscosity such as molten cheese, remoulade, béarnaise etc. It is an additional advantage according to the present invention that the methods and systems presented herein may be used for packaging of flowable products only, even without the presence of a solid food product. For instance, the technologies may be used for packaging of pure liquids such as beverages. The methods and systems may also be used together with a combinational weigher according to the prior art and/or the product containers may be weighed during the entire filling process in order to ensure that the final product is within the weight limits.

SUMMARY OF THE INVENTION

The above object and further objects which are evident from the below detailed description are according to a first aspect of the present invention achieved by a product dispenser comprising:

a tank for storing a flowable product such as a liquid, semi liquid or pasteous material, a conveyor for conveying storage containers along a longitudinal direction from an entry position to an exit position, and a dosing mechanism extending in the longitudinal direction above the conveyor, the dosing mechanism comprising an inner cylindrical part and an outer cylindrical part enclosing and sealing against the inner cylindrical part; the inner cylindrical part defining a circumferential groove extending between a first longitudinal position and a second longitudinal position, and a helically shaped groove extending between the circumferential groove at the second longitudinal position located at the entry position and a third longitudinal position located at the exit position; the outer cylindrical part defining an elongated opening extending in a longitudinal direction at least a part of and preferably the full distance between the second longitudinal position and the third longitudinal position, and an inlet opening located between the first longitudinal position and the second longitudinal position for establishing a fluid path from the tank via the circumferential groove and the helically shaped groove to the elongated opening, the inner cylindrical part being rotatable for dispensing the flowable product into the storage containers between the entry station and the exit station.

The present product dispenser is preferably made of durable and easy to clean materials such as stainless steel. The tank should be sufficiently large to accommodate a sufficient amount of flowable product, such as between 10 litres and 1000 litres. The conveyor is typically a conveyor belt, however, other conveying means are equally feasible such as transport screws etc. The storage containers may be made of various fluid tight materials such as metal, glass, plastics or paper coated with a suitable fluid tight material. The storage containers are upwardly open for being able to receive flowable products from above. The product containers enter the dispensing are at an entry station and exit the dispensing area at an exit station, although the conveyor itself may extend over a greater length. The longitudinal direction is in the present context the conveying direction of the conveyor belt.

The dosing mechanism is situated above the conveyor in order for the flowable product to be introduced into the product container from above aided by gravitational forces. The outer cylindrical part and the inner cylindrical part are sealing against each other such that the outer surface of the inner cylindrical part seals against the inner surface of the outer cylindrical part while allowing the parts to rotate relative to each other. The circumferential groove defines a circumferential cavity between the inner cylindrical part and the outer cylindrical part, whereas the helically shaped groove defines a helically shaped cavity between the inner cylindrical part and the outer cylindrical part. As the inner cylindrical part is rotating, the elongated opening of the outer cylindrical part exposes the helically shaped groove at different locations along the longitudinal direction. By rotating the inner cylindrical part at a suitable rotation speed and rotation direction, the location at which the helically shaped groove is being exposed may be moved along the longitudinal direction synchronously with the movement of the conveyor and, accordingly, with the storage containers located on the conveyor. The distance between two subsequent storage containers on the conveyor should preferably correspond to the longitudinal distance covered by one turn of the helically shaped groove in order to fill all storage containers on the conveyor.

The flowable product is transported from the storage tank via the inlet opening into the circumferential cavity. The circumferential cavity is sealed off from the outside except via the inlet opening and the helically shaped groove. The flowable product is thus urged into the helically shaped groove and continuously dispensed at the location at which the helically shaped groove is exposed by the elongated groove. By selecting a suitable rotation speed and direction as indicated above, the conveyor must not be stopped and the dosing mechanism must not be moved synchronously with the conveyor. The amount of flowable product to be dispensed may be controlled by suitable valve mechanisms. After the storage containers have been filled, they are sealed off and shipped to the customer.

According to a further embodiment of the first aspect, the helically shaped groove defines substantially one turn between the second longitudinal position and the third longitudinal position. By allowing the helically shaped groove to define one turn, one full turn of the inner cylindrical part should correspond to the movement of the conveyor from the second longitudinal position to the third longitudinal position. This allows one storage container to be present between the second and third longitudinal position.

According to a further embodiment of the first aspect, the helically shaped groove defines more than one turn between the second longitudinal position and the third longitudinal position, such as between 2 and 10 turns. In this way more than one storage container may be filled between the second and third longitudinal position.

According to a further embodiment of the first aspect, the helically shaped groove defines less than one turn between the second longitudinal position and the third longitudinal position, such as between 0.5 and 0.95 turns. In this way, some angular positions of the inner cylindrical part will not expose the helically shaped groove at the elongated groove and thus the helically shaped groove will be sealed off at such angular locations.

According to a further embodiment of the first aspect, the inner cylindrical part comprises a further helically shaped groove, the further helically shaped groove preferably being offset by ½ turn in relation to the helically shaped groove. In this way, two adjacent storage containers may be filled simultaneously.

According to a further embodiment of the first aspect, the inner cylindrical part comprises a further circumferential groove, the further circumferential groove being fluidly connected to the further helically shaped groove, optionally via a central passage. In this way, two adjacent storage containers may be filled simultaneously with increases control since each circumferential groove may be connected to a separate inlet opening.

According to a further embodiment of the first aspect, the product dispenser further comprises a pump for pumping the flowable material from the tank to the circumferential groove. A pump may be provided between the tank and the inlet opening in order to be able to control the amount of flowable material to be dispensed.

According to a further embodiment of the first aspect, the inner cylindrical part and an outer cylindrical part are movable relative to each other in the longitudinal direction. In this way the position at which the dispensing of flowable material into the storage containers starts may be altered.

According to a further embodiment of the first aspect, the product dispenser comprising at least two dosing mechanisms arranged in series. In this way, two storage containers may be filled simultaneously.

According to a further embodiment of the first aspect, the elongated opening extends in a longitudinal direction substantially the full distance between the second longitudinal position and the third longitudinal position. In order to maximize the length at which flowable products may be dispensed into containers, the elongated opening may extend the whole length between the second longitudinal position and the third longitudinal position According to a further embodiment of the first aspect, the elongated opening defines a circumferential width of 1°-20°, such as 5°-10°. The elongated opening of the outer cylindrical part should be facing downwards towards the storage containers located on the conveyor. The distance between the elongated opening and the storage containers should be as low as possible, such as about 10 cm, in order to prevent spillage. The angular width of the elongated opening should be small, such as the above mentioned 1°-20°, such as 5°-10°, corresponding to typically a few cm, in order to achieve a well defined dispensing.

According to a further embodiment of the first aspect, the outer cylindrical part comprises a backflow pipe for transporting flowable material from the circumferential groove to the tank or another tank. In order to not overflow the helically shaped groove and/or overstress any pumping mechanism, a backflow pipe may be provided ensuring a steady flow of flowable product through the dosing mechanism.

According to a further embodiment of the first aspect, the outer cylindrical part is movable in the circumferential direction. Normally, the outer cylindrical part is stationary, however, it may also be rotatable in order to direct the flow of flowable product sidewards.

According to a further embodiment of the first aspect, the dosing mechanism comprises an intermediate cylindrical part located inbetween and sealing against the outer cylindrical part and the inner cylindrical part, the intermediate cylindrical part being rotatable in relation to the outer cylindrical part and the inner cylindrical part and comprises a second elongated opening corresponding to the elongated opening of the outer cylindrical part. In this way the dispensing of the flowable product may be controlled to a much larger extent by allowing dispensing when the elongated opening of the outer cylindrical part and the second elongated opening of the intermediate part are flush, while preventing dispensing when the elongated opening of the outer cylindrical part and the second elongated opening of the intermediate part are displaced in relation to each other and thus prevent exposure of the helically shaped groove.

According to a further embodiment of the first aspect, the intermediate cylindrical part comprises a third elongated opening. In this way dispensing of flowable material may be allowed along a part of the distance between the second longitudinal position and the third longitudinal position and prevented the remaining part of the distance between the second longitudinal position and the third longitudinal position.

According to a further embodiment of the first aspect, the second elongated opening and the third elongated opening are circumferentially offset. In this way the dispensing of flowable product may be controlled by selectively matching the second elongated opening and the third elongated opening of the intermediate cylindrical part with the elongate opening of the outer cylindrical part.

According to a further embodiment of the first aspect, the outer cylindrical part comprises a further backflow pipe for transporting flowable material from the helically shaped groove to the tank or another tank. In this way the helically shaped groove and the intermediate cylindrical part will be less stressed when dispensing is prevented by the intermediate cylindrical part.

The above object and further objects which are evident from the below detailed description are according to a first aspect of the present invention achieved by a method of dispensing a flowable product, the method comprising proving a product dispenser, the product dispenser comprising:
  a tank comprising a flowable product such as a liquid, semi liquid or pasteous material,
  a conveyor extending along a longitudinal direction from an entry position to an exit position, and
  a dosing mechanism extending in the longitudinal direction above the conveyor, the dosing mechanism comprising an inner cylindrical part and an outer cylindrical part enclosing and sealing against the inner cylindrical part; the inner cylindrical part defining a circumferential groove extending between a first longitudinal position and a second longitudinal position, and a helically shaped groove extending between the circumferential groove at the second longitudinal position located at the entry position and a third longitudinal position located at the exit position; the outer cylindrical part defining an inlet opening located between the first longitudinal position and the second longitudinal position, and an elongated opening extending in a longitudinal direction at least a part of the distance between the second longitudinal position and the third longitudinal position, the method further comprising the step of continuously:
  feeding the flowable product from the tank via the inlet opening, the circumferential groove and the helically shaped groove to the elongated opening,
  conveying storage containers along a longitudinal direction from the entry position to an exit position and
  rotating the inner cylindrical part thereby dispensing the flowable product into the storage containers between the entry station and the exit station.

The method according to the second aspect is preferably used in conjunction with the product dispenser according to the first aspect.

BRIEF DESCRIPTION OF THE DRAWINGS

FIG. 3 is a cut-out view of the dosing mechanism according to the present invention.

FIG. 4A is a cut-out view illustrating the working principle of the dosing mechanism according to the present invention.

FIG. 4B is an outside view of the dosing mechanism from below.

FIG. 5A is a cut-out view of the dosing mechanism according to the present invention when the inner cylindrical part has rotated.

FIG. 5B is an outside view of the dosing mechanism of the previous figure from below.

FIGS. 6A and B are illustrating an alternative embodiment in which dispensing may be temporarily stopped.

FIGS. 7A and B are illustrating an alternative embodiment having a backflow pipe.

FIGS. 8 to 13 are illustrating an alternative embodiment having an intermediate cylindrical part made up of two elements.

FIGS. 14 to 18 are illustrating an alternative embodiment having an intermediate cylindrical part made up of one element.

FIGS. 22A and B are illustrating another alternative embodiment in which the inner cylindrical part has two helically shaped grooves, two circumferential grooves and a central passage.

DETAILED DESCRIPTION

Figure 1:
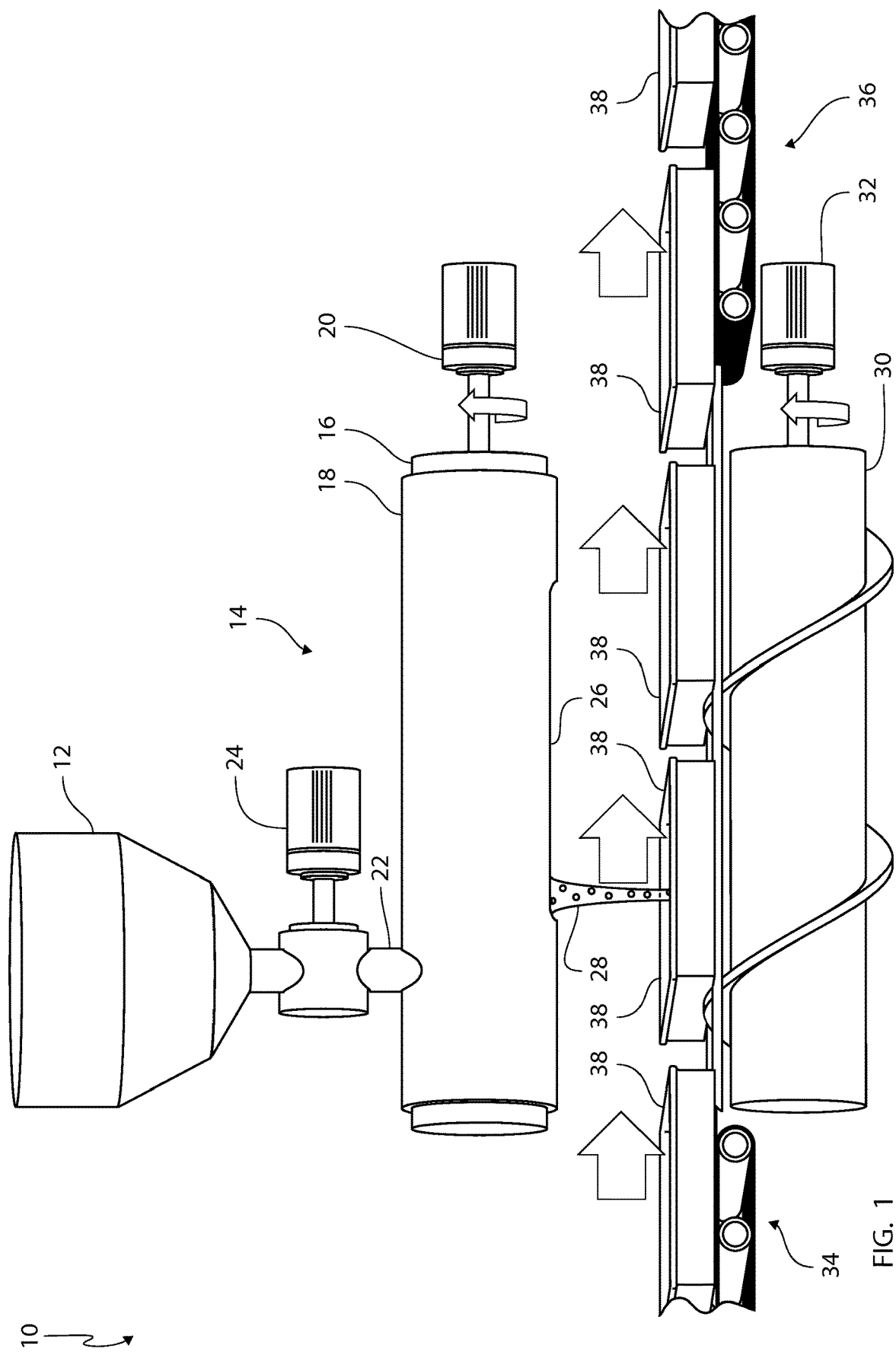
FIG. 1 is a perspective view of the product dispenser according to the present invention.

FIG. 1 shows a perspective view of the product dispenser 10 according to the present invention. The product dispenser comprises a tank 12 for storing a flowable product such as a liquid, semi liquid or pasteous material. The product dispenser 10 further comprises a dosing mechanism 14. The dosing mechanism 14 comprises an inner cylindrical part 16 and an outer cylindrical part 18. The inner cylindrical part 16 is connected to a motor 20 for rotating the inner cylindrical part 16 relative to the outer cylindrical part 18.

The tank 12 is connected to an inlet opening 22 of the outer cylindrical part 18 via a pump 24. The pump forces the flowable product into the dosing mechanism 14. The outer cylindrical part comprises an elongated opening 26 for dispensing the flowable product 28.

The product dispenser 10 further comprises a conveyor 30 which in the present context is illustrated as a screw conveyor driven by a conveyor drive 32, however, other conveyor types are equally feasible such as belt conveyors etc. The conveyor 30 extends in a longitudinal direction between an entry position 34 and an exit position 36. Upwardly open food storage containers 38 are provided at the entry position 34. The food storage containers 38 are conveyed by means of the conveyor 30 between the entry position 34 and the exit position 36 below the elongated opening 26 of the outer cylindrical part for receiving flowable product 28 into the container 38.

Figure 2:
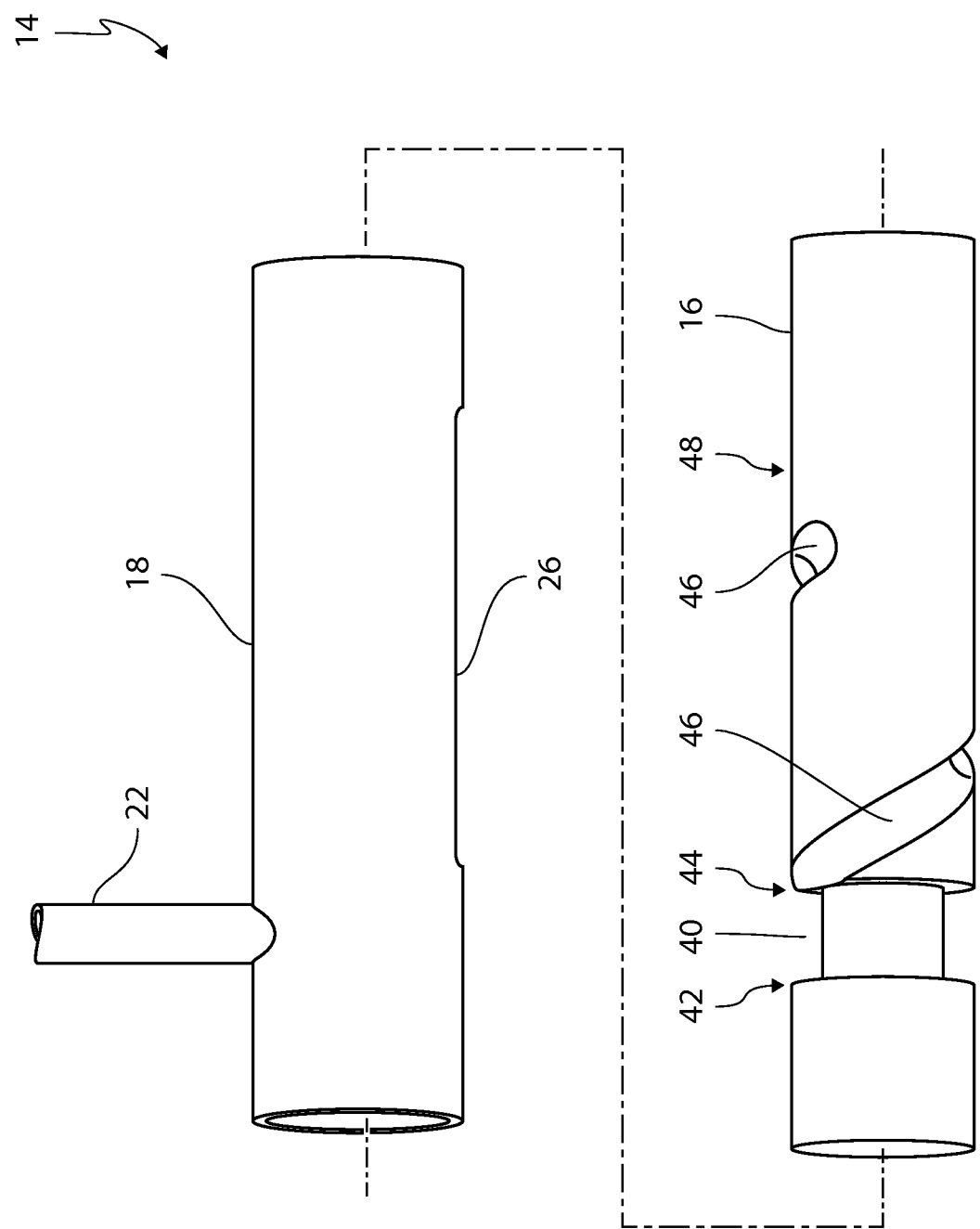
FIG. 2 is a perspective view of the outer and inner cylindrical parts according to the present invention.

FIG. 2 shows a perspective view of the outer cylindrical part 18 and the and inner cylindrical part 16 of the dosing mechanism 14. The inner cylindrical part 16 comprises a circumferential groove 40 located at the inlet opening 22 of the outer cylinder 18 and extending between a first longitudinal position 42 and a second longitudinal position 44, and, a helically shaped groove 46 extending between the second longitudinal position 44 and a third longitudinal position 48, at which approximate position also the elongated opening 26 ends. When the dosing mechanism 14 is assembled, the circumferential groove 40 is sealed off at the first position 42 and is only connected to the helically shaped groove 46 at the second position.

FIG. 3A shows a cut-out view of the dosing mechanism 14 according to the present invention. The flowable product 28 enters the dosing mechanism 14 from above via the inlet opening 22 and is fed to the circumferential groove 40. The flowable product 28 is further transported via the helically shaped groove 46 to the elongated opening 26 at which location the flowable product 28 is dispensed into the storage container 38.

As the inner cylindrical part 16 is rotating, the helically shaped groove 46 is exposed at different locations at the elongated groove 26. By rotating the inner cylindrical part 16 at a velocity and direction corresponding to the speed and direction of the conveyor 30, the dosing mechanism 14 will be able to dispense the flowable product 28 into the storage container 38 when the storage container is moving on the conveyor 30. The helically shaped groove 46 may have a user selected number of turns.

The distance between two turns should correspond to the distance between two storage containers 38 on the conveyor 30. As can be seen in the present view, the dosing mechanism is dispensing flowable product into one storage container 38' at a location adjacent the second longitudinal position, and into a further storage container 38" at a further location adjacent the third longitudinal position.

FIG. 3B shows an outside view of the dosing mechanism 14 from below. The locations at which the helically shaped groove 26 is exposed at the elongated opening 26 are indicated by a filled line, whereas the locations at which the helically shaped groove 26 is obscured by the outer cylindrical part 18 are shown by dashed lines.

FIG. 4A shows a cut-out view of the dosing mechanism 14 according to the present invention when the inner cylindrical part 16 has rotated in the direction shown by the arrow and at a velocity being synchronous with the velocity of the conveyor (not shown). As can be seen in the present view, the dosing mechanism is dispensing flowable product into only one storage container 38' at a location between the second longitudinal position and the third longitudinal position.

FIG. 4B shows an outside view of the dosing mechanism 14 of FIG. 4A from below. As can be seen in the figure, the helically shaped groove is exposed at only one location of the elongated opening 26.

FIG. 5A shows an alternative embodiment of the dosing mechanism 14' of the previous figure in which the circumferential groove 40 is wider.

FIG. 5B shows the embodiment of FIG. 5A from below. It can be seen that the dosing mechanism 14' is only exposing the helically shaped groove 46 at a location adjacent the second longitudinal position 44.

FIG. 6A shows the alternative embodiment of the dosing mechanism 14' when the inner cylindrical part 16 has been shifted in a direction as shown by the arrow, i.e. towards the first longitudinal position 42. This alters the number of turns of the helically shaped groove 46 which are exposable at the elongated opening 26.

FIG. 6B shows the embodiment of FIG. 6A from below. In the present situation, the elongated opening 26 has been completely closed off, i.e. the helically shaped groove 46 is completely obscured by the outer cylindrical part 18. In this way the dispensing of flowable product 28 may be interrupted.

FIG. 7A shows a further alternative embodiment of the dosing mechanism 14" similar to the embodiment shown in FIG. 5A, however, including a backflow pipe 50 leading to the tank 12 or alternatively to another tank especially designated to accommodate the flowable product from the backflow pipe 50. In the present view, the backflow pipe 50 is obscured by the inner cylindrical part 16 while the helically shaped grove 46 is exposed at the elongated opening 26 adjacent the second longitudinal position 44.

FIG. 7B shows the embodiment of FIG. 7A from below. The flowable product 28 is allowed to be dispensed.

FIG. 8A shows the alternative embodiment of the dosing mechanism 14" similar to the embodiment shown in FIG. 6A, however, including a backflow pipe 50. In the present view, the backflow pipe 50 is exposed by the inner cylindrical part 16 while the helically shaped grove 46 is obscured at the elongated opening 26.

FIG. 8B shows the embodiment of FIG. 8A from below. The flowable product 28 is not dispensed, but caused to enter the backflow pipe 50.

FIG. 9A shows a further embodiment of the dosing mechanism 14''' in which an intermediate cylindrical part 52 is provided between the outer cylindrical part 18 and the inner cylindrical part 16. The outer cylindrical part 18 is provided with a return flow pipe 54 and the intermediate cylindrical part 52 is provided with further elongated openings 56, 56'. The intermediate cylindrical part 52 comprises two elements which are independently rotatable. The return flow pipe 54 is similar to and serves the same purpose as the previously mentioned backflow pipe 50.

FIG. 9B shows a cross-sectional view of the outer cylindrical part 18 of the dosing mechanism 14''' at two longitudinal locations showing the elongated opening 26 and the return flow pipe 54.

FIG. 9C shows a cross-sectional view of the intermediate cylindrical part 52 of the dosing mechanism 14''' at two longitudinal locations showing the further elongated openings 56 56'.

FIG. 9D shows a cross-sectional view of the inner cylindrical part 16 of the dosing mechanism 14''' at two longitudinal locations.

FIG. 10A shows the dosing mechanism 14''' in which the intermediate cylindrical part 52 allows dispensing of flowable product both at location A and location B.

FIG. 10B shows the dosing mechanism 14''' in which the intermediate cylindrical part 52 allows dispensing of flowable product at location A.

FIG. 10C shows the dosing mechanism 14''' in which the intermediate cylindrical part 52 allows dispensing of flowable product at location B.

FIG. 11A shows the dosing mechanism 14''' in which the intermediate cylindrical part 52 prevents dispensing of flowable product at location A, but allows dispensing of flowable product at location B.

FIG. 11B shows the dosing mechanism 14''' in which the intermediate cylindrical part 52 prevents dispensing of flowable product at location A.

FIG. 11C shows the dosing mechanism 14''' in which the intermediate cylindrical part 52 allows dispensing of flowable product at location B.

FIG. 12A shows the dosing mechanism 14''' in which the intermediate cylindrical part 52 prevents dispensing of flowable product both at location A and B.

FIG. 12B shows the dosing mechanism 14''' in which the intermediate cylindrical part 52 prevents dispensing of flowable product at location A.

FIG. 12C shows the dosing mechanism 14''' in which the intermediate cylindrical part 52 prevents dispensing of flowable product at location B.

FIG. 13A shows the dosing mechanism 14''' in which the intermediate cylindrical part 52 allows dispensing of flowable product at location A and prevents dispensing of flowable product at location B.

FIG. 13B shows the dosing mechanism 14''' in which the intermediate cylindrical part 52 allows dispensing of flowable product at location A.

FIG. 13C shows the dosing mechanism $14'''$ in which the intermediate cylindrical part 52 prevents dispensing of flowable product at location B.

FIG. 14A shows a dosing mechanism $14^{IV}$ in which the intermediate cylindrical part 52' is shaped for allowing the functionality of being able to selectably allow or prevent dispensing of flowable product in two areas along the longitudinal direction.

FIG. 14B shows a flat rolled out projection of the intermediate cylindrical part 52' in which the two elongated openings 56" 56'" are shown.

Figure 15C:
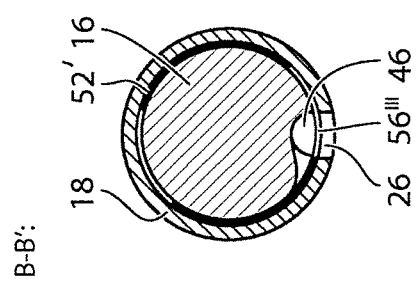
Figure 15B:
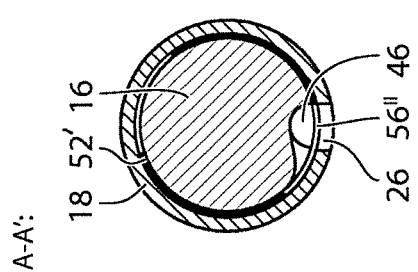
Figure 15A:
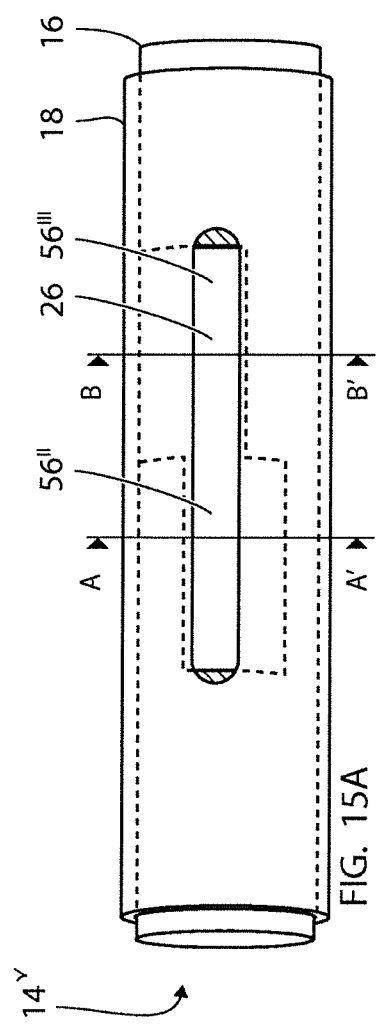

FIG. 15A shows a dosing mechanism $14^V$ in which the intermediate cylindrical part 52' allows dispensing of flowable product both at location A and location B.

FIG. 15B shows the dosing mechanism $14^V$ in which the intermediate cylindrical part 52' allows dispensing of flowable product at location A.

FIG. 15C shows the dosing mechanism $14^V$ in which the intermediate cylindrical part 52' allows dispensing of flowable product at location B.

Figure 16C:
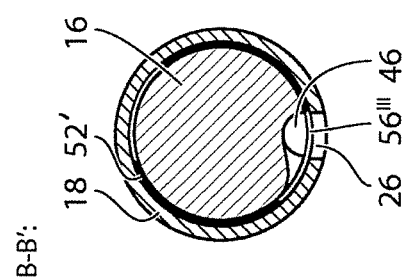
Figure 16B:
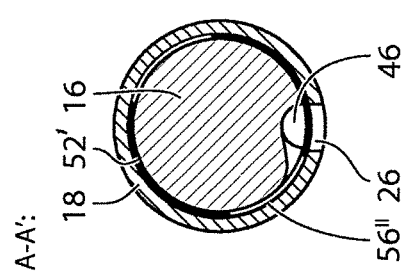
Figure 16A:
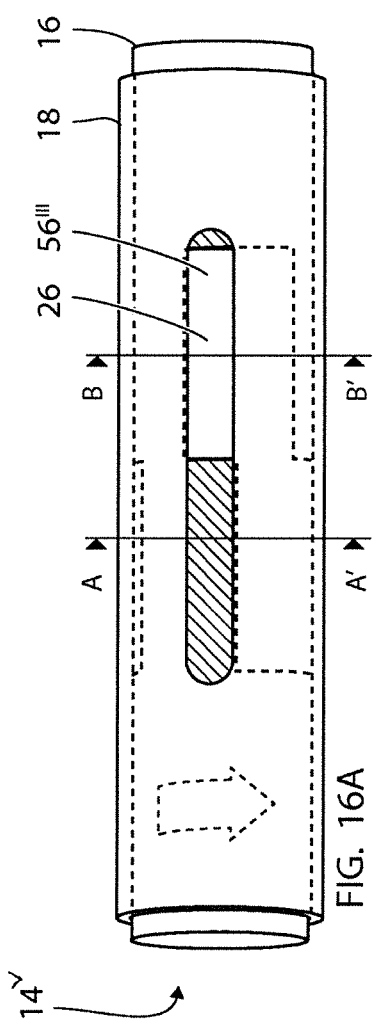

FIG. 16A shows the dosing mechanism $14^V$ in which the intermediate cylindrical part 52' prevents dispensing of flowable product at location A, but allows dispensing of flowable product at location B.

FIG. 16B shows the dosing mechanism $14^V$ in which the intermediate cylindrical part 52' prevents dispensing of flowable product at location A.

FIG. 16C shows the dosing mechanism $14^V$ in which the intermediate cylindrical part 52' allows dispensing of flowable product at location B.

Figure 17C:
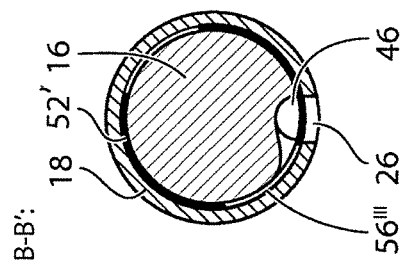
Figure 17B:
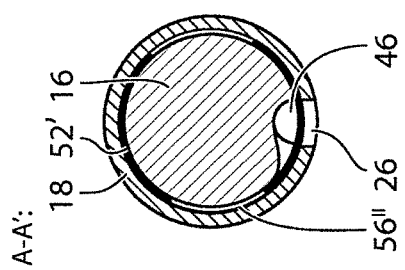
Figure 17A:
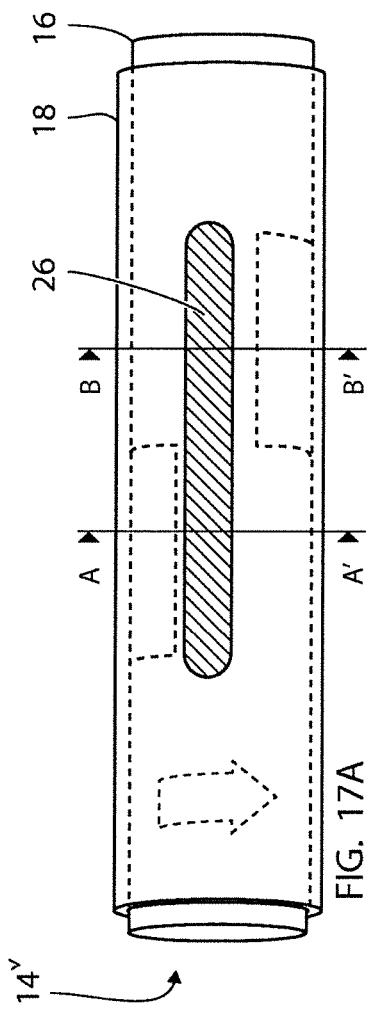

FIG. 17A shows the dosing mechanism $14^V$ in which the intermediate cylindrical part 52 prevents dispensing of flowable product both at location A and B.

FIG. 17B shows the dosing mechanism $14^V$ in which the intermediate cylindrical part 52' prevents dispensing of flowable product at location A.

FIG. 17C shows the dosing mechanism $14^V$ in which the intermediate cylindrical part 52' prevents dispensing of flowable product at location B.

Figure 18C:
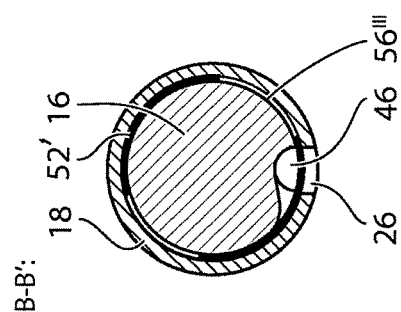
Figure 18B:
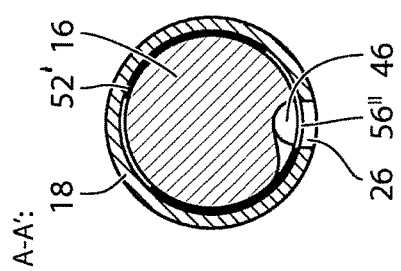
Figure 18A:
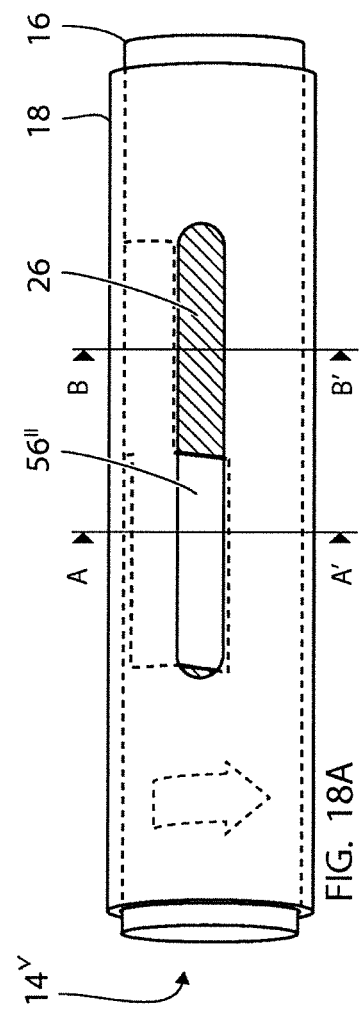

FIG. 18A shows the dosing mechanism $14^V$ in which the intermediate cylindrical part 52' allows dispensing of flowable product at location A, but prevents dispensing of flowable product at location B.

FIG. 18B shows the dosing mechanism $14^V$ in which the intermediate cylindrical part 52' allows dispensing of flowable product at location A.

FIG. 18C shows the dosing mechanism $14^V$ in which the intermediate cylindrical part 52' prevents dispensing of flowable product at location B.

Figure 19:
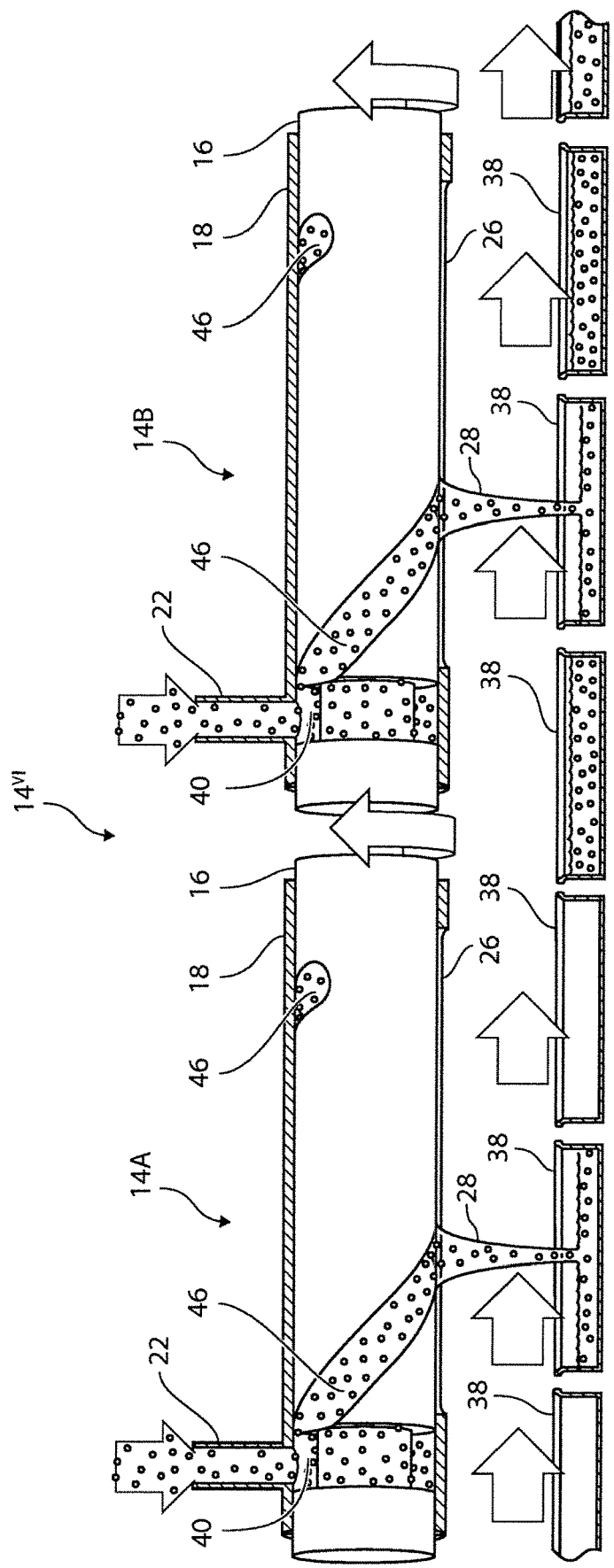
FIG. 19 is illustrating another alternative embodiment in which two dosing mechanisms are connected in series.

FIG. 19 shows a side vies of another dosing mechanism $14^{VI}$ in which two dosing mechanisms 14A, 14B are connected in series. In this way two storage containers 38 may be filled simultaneously. Each of the dosing mechanisms 14A, 14B may essentially be constructed identical to any of the previously shown dosing mechanisms, however, in each of the dosing mechanisms 14A, 14B instead of selecting the distance between two subsequent storage containers 38 to correspond to the distance covered by one turn of the helically shaped groove 46, the distance between two subsequent storage containers 38 corresponds to half the distance covered by one turn of the helically shaped groove 46. This can be made by altering the pitch of the helically shaped groove 46 and/or the longitudinal size of the storage containers 38. In this way the dosing mechanisms 14A, 14B may be arranged such that the dosing mechanisms 14A, 14B each serves every second storage container 38 on the conveyor 30.

Figure 20:
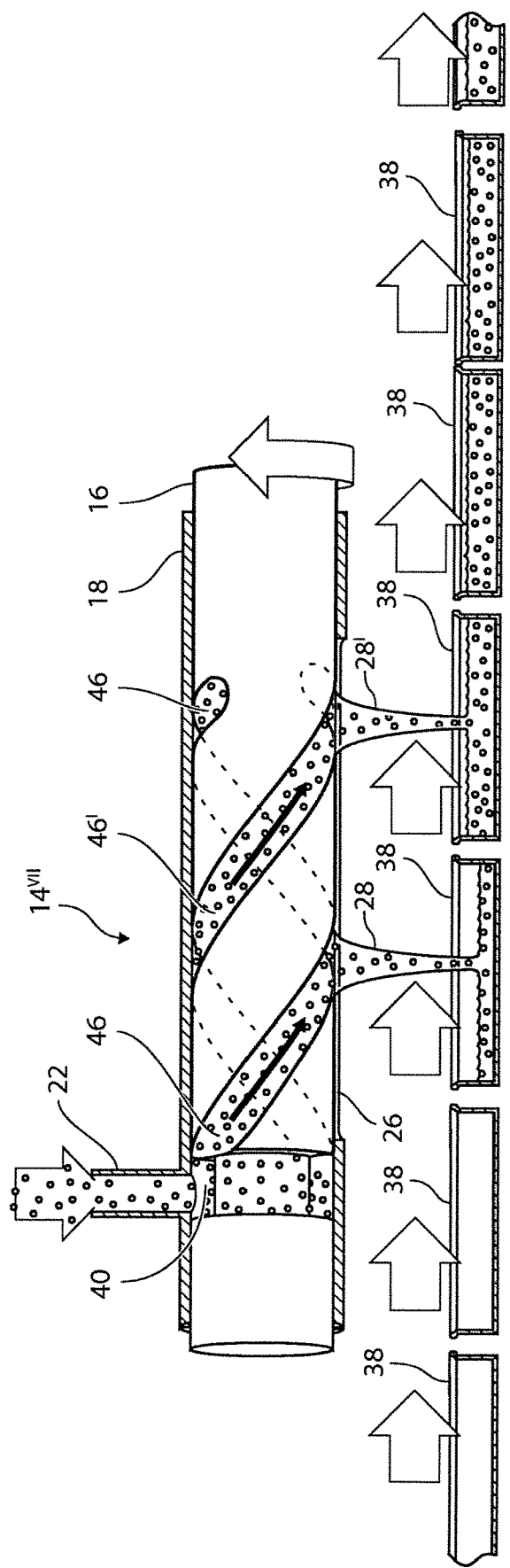
FIG. 20 is illustrating another alternative embodiment in which the inner cylindrical part has two helically shaped grooves.

FIG. 20 shows a side view of another dosing mechanism $14^{VII}$ in which the inner cylindrical part 16 has two helically shaped grooves 46 46'. In this way two subsequent storage containers 38 may be filled simultaneously without the need of another dosing mechanism. In the present embodiment, both helically shaped grooves 46 46' are connected to the same circumferential groove 40, however, the helically shaped grooves 46 46' are circumferentially off-set by half a turn, or 180°. The flow direction of the flowable product in each of the helically shaped grooves 46 46' are shown by arrows.

Figure 21:
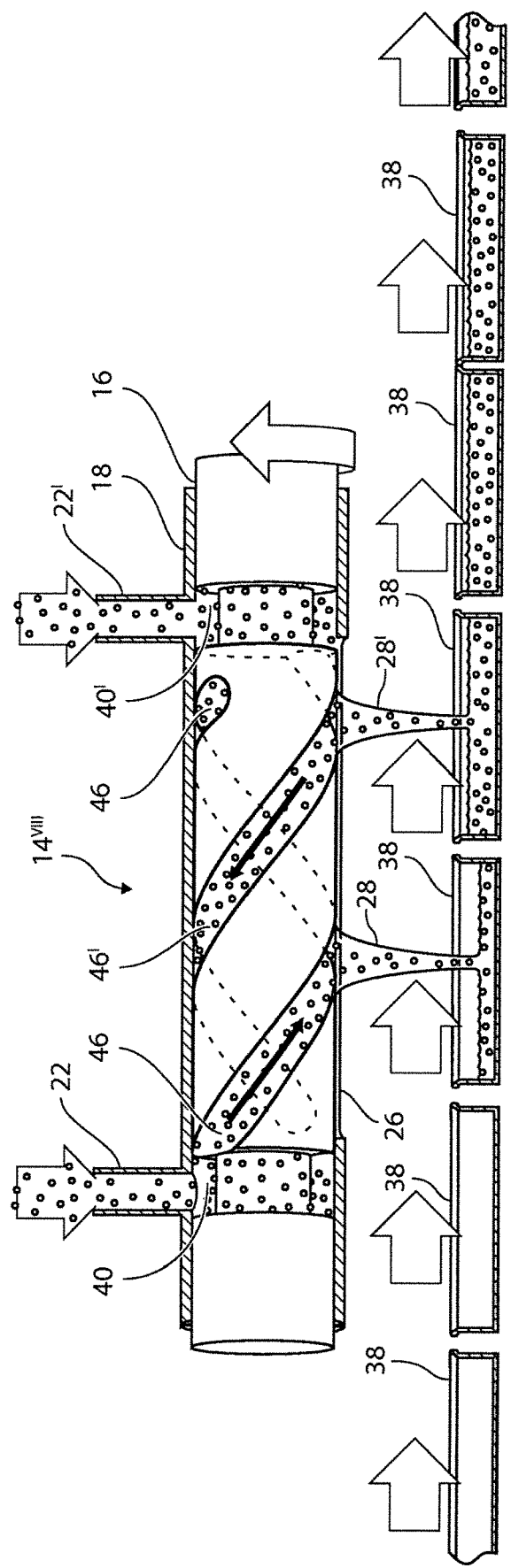
FIG. 21 is illustrating another alternative embodiment in which the inner cylindrical part has two helically shaped grooves and two circumferential grooves.

FIG. 21 shows a side view of another dosing mechanism $14^{VII}$ in which the inner cylindrical part 16 has two helically shaped grooves 46 46', similar to the previous embodiment. In the present embodiment, each of helically shaped grooves 46 46' are connected to a separate circumferential groove 40 40', respectively. The circumferential grooves 40 40' are located at opposite ends of the dosing mechanism $14^{VII}$. The helically shaped grooves 46 46' are still circumferentially off-set by half a turn, or 180 degrees. The circumferential groove 40 only feeds the helically shaped groove 46 whereas the circumferential groove 40' only feeds the helically shaped groove 46'. The flow direction of the flowable product in each of the helically shaped grooves 46 46' is shown by arrows. The present embodiment has the advantage compared to the previous embodiment in which both helically shaped grooves are fed from the same circumferential groove that the dispensing may be controlled to a much larger extent since each circumferential groove may be fed by a separate pump.

FIG. 22A shows a side view of another dosing mechanism $14^{IX}$ in which the inner cylindrical part 16 has two helically shaped grooves 46 46', two circumferential grooves 40 40' and a central passage (not shown). The flow direction of the flowable product in each of the helically shaped grooves 46 46' are shown by arrows.

FIG. 22B shows a side cut out view of the dosing mechanism $14^{IX}$. The central passage 58 is provided from the circumferential groove 40' to the helically shaped grooves 46' through the center of the inner cylindrical part 16 such that both the two helically shaped grooves 46 46' are fed from different circumferential grooves 40 40' but from the same direction. The flow direction of the flowable product in each of the helically shaped grooves 46 46' are shown by arrows.

It is evident that numerous modifications may be made to the above dosing mechanisms without departing from the inventive idea of the presently claimed invention. For instance, it is evident that the longitudinal size of the containers and the pitch of the helically shaped groove may be modified to suit the specific need of the user. As an example, the above dosing mechanisms as shown in FIGS. 19, 21-22 may alternatively be used for dispensing two different flowable materials into the same storage containers, or two different flowable materials in two different containers.

LIST OF REFERENCE NUMERALS USED IN THE FIGURES

10. Product dispenser
12. Tank
14. Dosing mechanism
16. Inner cylindrical part
18. Outer cylindrical part
20. Motor
22. Inlet opening 24. Pump
26. Elongated opening
28. Flowable product
30. Conveyor
32. Conveyor drive
34. Entry position
36. Exit position
38. Storage containers
40. Circumferential groove
42. First longitudinal position
44. Second longitudinal position
46. Helically shaped groove
48. Third longitudinal position
50. Backflow pipe
52. Intermediate cylindrical part
54. Return flow pipe
56. Further elongated openings
58. Central passage

The invention claimed is:

1. A dosing mechanism for dispensing a flowable product from a tank into storage containers conveyed along a longitudinal direction from an entry position to an exit position, the dosing mechanism comprising:
an inner cylindrical part coaxial with and rotatable within an outer cylindrical part having an inner surface;
wherein the inner cylindrical part has an outer surface defining (i) at least one circumferential groove extending between a first longitudinal position and a second longitudinal position located at the entry position, and (ii) at least one helically-shaped groove extending between the at least one circumferential groove at the second longitudinal position and a third longitudinal position located at the exit position, the at least one helically-shaped groove thereby forming at least one helically-shaped channel within the dosing mechanism;
wherein the outer surface of the inner cylindrical part, except for the at least one circumferential groove and the at least one helically-shaped groove, is in sealing contact with the inner surface of the outer cylindrical part;
wherein the outer cylindrical part defines (i) an inlet opening located between the first longitudinal position and the second longitudinal position, and in fluid communication with the at least one circumferential groove, and (ii) an elongated outlet opening extending longitudinally at least a part of the distance between the second longitudinal position and the third longitudinal position; and
wherein rotation of the inner cylindrical part within the outer cylindrical part exposes a portion of the at least one helically-shaped groove through the outlet opening at different longitudinal locations along the outlet opening, whereby a single continuous fluid path of varying length is defined from the inlet opening to the outlet opening through the at least one circumferential groove and a portion of the at least one helically-shaped groove extending from the at least one circumferential groove to the exposed portion of the at least one helically-shaped groove to dispense the flowable product into the storage containers from the outlet opening between the entry position and the exit position.

2. The dosing mechanism of claim 1, wherein the at least one helically shaped groove defines at least one turn between the second longitudinal position and the third longitudinal position.

3. The dosing mechanism of claim 1, wherein the at least one helically shaped groove defines less than one turn between the second longitudinal position and the third longitudinal position.

4. The dosing mechanism of claim 1, wherein the at least one helically shaped groove is a first helically shaped groove, and wherein the inner cylindrical part further defines a second helically shaped groove offset by ½ turn in relation to the first helically shaped groove.

5. The dosing mechanism of claim 4, wherein the at least one circumferential groove is a first circumferential groove, and wherein the inner cylindrical part defines a second circumferential groove fluidly connected to the second helically shaped groove.

6. The dosing mechanism of claim 1, wherein the inner cylindrical part and the outer cylindrical part are movable relative to each other in the longitudinal direction.

7. The dosing mechanism of claim 1, wherein the outlet opening defines a circumferential width of 1°-20°.

8. The dosing mechanism of claim 1, wherein the outer cylindrical part comprises a backflow pipe configured for transporting the flowable product from the at least one circumferential groove out of the dosing mechanism.

9. The dosing mechanism of claim 8, wherein the inner cylindrical part and the outer cylindrical part are movable relative to each other in the longitudinal direction between a first position in which the backflow pipe is open to the at least one circumferential groove and a second position in which the backflow pipe is closed to the at least one circumferential groove.

10. The dosing mechanism of claim 1, wherein the outer cylindrical part is movable in the circumferential direction.

11. A method of dispensing a flowable product from a tank into storage containers conveyed along a longitudinal direction from an entry position to an exit position, the method comprising:
(a) providing a dosing mechanism extending in a longitudinal direction, the dosing mechanism comprising an inner cylindrical part coaxial with and rotatable within an outer cylindrical part having an inner surface; wherein the inner cylindrical part has an outer surface defining (i) at least one circumferential groove extending between a first longitudinal position and a second longitudinal position located at the entry position, and (ii) at least one helically-shaped groove extending between the at least one circumferential groove at the second longitudinal position and a third longitudinal position located at the exit position, the at least one helically-shaped groove thereby forming at least one helically-shaped channel in the dosing mechanism; wherein the outer surface of the inner cylindrical part, except for the at least one circumferential groove and the at least one helically-shaped groove, is in sealing contact with the inner surface of the outer cylindrical part; and wherein the outer cylindrical part defines (i) an inlet opening located between the first longitudinal position and the second longitudinal position, and in fluid communication with the at least one circumferential groove, and (ii) an elongated outlet opening extending longitudinally at least a part of the distance between the second longitudinal position and the third longitudinal position;
(b) conveying a plurality of containers beneath the outlet opening along a longitudinal direction from the entry position to the exit position;
(c) rotating the inner cylindrical part within the outer cylindrical part to expose a portion of the at least one helically-shaped groove through the outlet opening at different longitudinal locations along the outlet opening, whereby a single continuous fluid path of varying length is defined from the inlet opening to the outlet opening through the at least one circumferential groove and a portion of the helically-shaped groove extending from the circumferential groove to the exposed portion of the at least one helically-shaped groove; and (d) feeding the flowable product from the tank via the inlet opening, the at least one circumferential groove, the at least one helically-shaped groove, and the exposed portion of the at least one helically-shaped groove to the outlet opening, thereby dispensing the flowable product from the outlet opening into the containers between the entry position and the exit position.

* * * * *